United States Patent [19]

Azar

[11] 4,290,524

[45] Sep. 22, 1981

[54] VIDEO MAGAZINE AND PACKAGE THEREFOR

[76] Inventor: Charles Azar, 4149 Bonita Ave., Coconut Grove, Fla. 33133

[21] Appl. No.: 105,348

[22] Filed: Dec. 19, 1979

[51] Int. Cl.³ .................... B65D 85/57; B65D 85/671; B42D 3/18

[52] U.S. Cl. .................................. 206/232; 206/387; 206/309; 281/31

[58] Field of Search ............... 206/232, 216, 223, 309, 206/311, 312, 313, 387; 281/31

[56] References Cited

U.S. PATENT DOCUMENTS

| | | | |
|---|---|---|---|
| 3,077,263 | 2/1963 | Froehlig | 206/313 |
| 3,340,999 | 9/1967 | Froehlig | 206/309 |
| 3,553,851 | 1/1971 | Paige | 206/232 |
| 3,583,729 | 6/1971 | DeGroat | 206/232 |
| 3,722,564 | 3/1973 | Croon | 206/309 |
| 3,829,132 | 8/1974 | Willieme | 206/216 |

*Primary Examiner*—William T. Dixson, Jr.

*Attorney, Agent, or Firm*—Thomas M. Gibson

[57] ABSTRACT

A video magazine for use with a video cassette recorder apparatus comprises the combination of a video cassette having a series of indexable video programs, and a printed program which includes a series of program guides corresponding to each program in the series of indexable video programs on the video cassette. By referring to the printed program, the user may readily index the video cassette in the video recording apparatus to the desired program. The video cassette and the printed program are shipped and stored in an integral package formed of a generally rectangular sleeve for accommodating the printed program, and a second sleeve bonded to the first sleeve and of a size adapted to accommodate the video cassette. The resulting point-of-purchase package provides the consumer with an indication of the variety of programming available in the video magazine, and is of a configuration to inhibit shoplifting.

6 Claims, 5 Drawing Figures

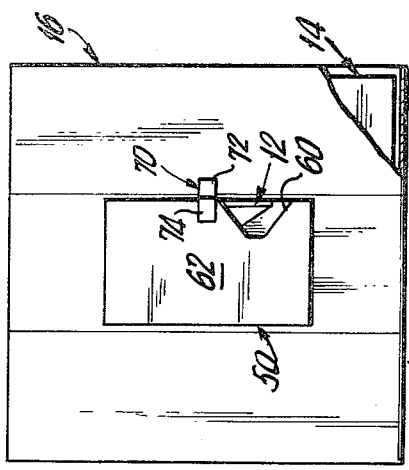
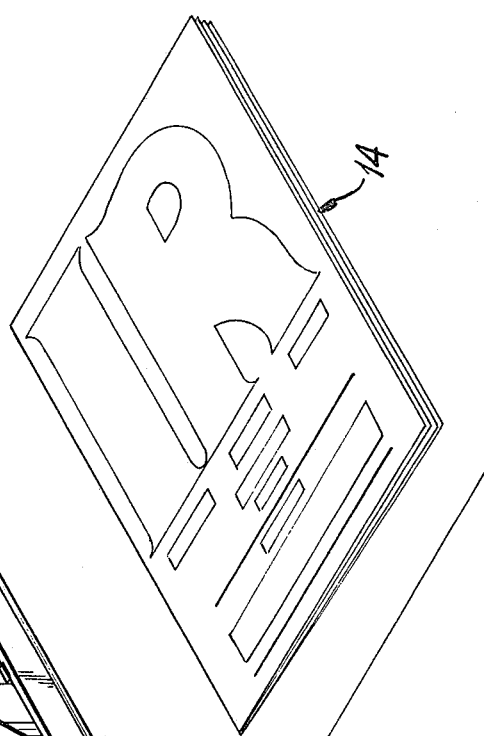
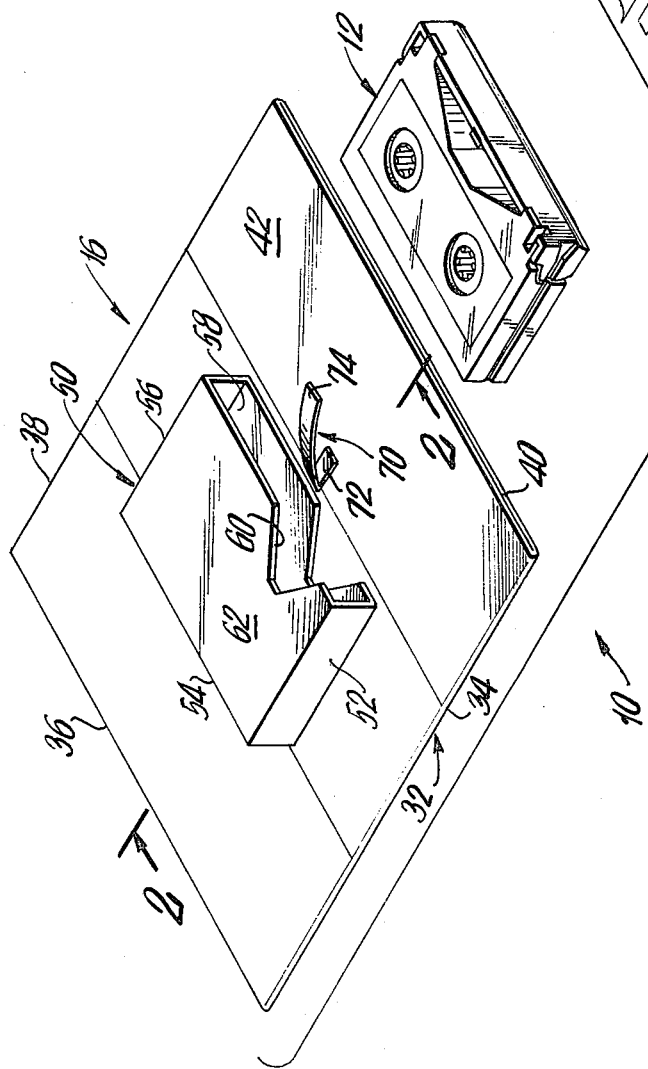
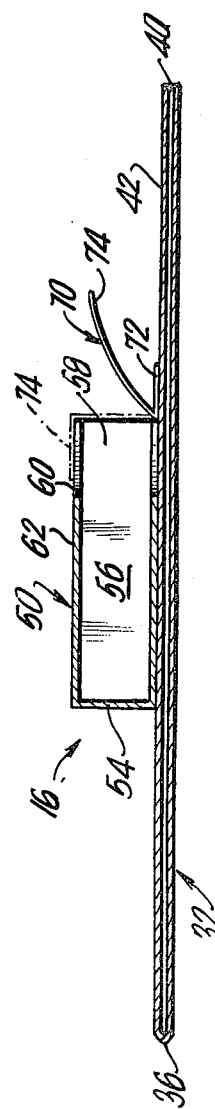

VIDEO MAGAZINE AND PACKAGE THEREFOR

The present invention relates to a video magazine for use with a video recording apparatus, as well as a package for shipping and storing the video magazine in such manner as to make the consumer aware of the programming available in the video magazine and enable the packaged video magazine to be accommodated in existing record racks, while at the same time minimizing the possibility of shoplifting of the video magazine package.

Heretofore, the advent of video recording apparatus has provided the owner of such equipment with the limited opportunities of using the apparatus for viewing recycled movies, low quality films, and rebroadcasts of regular network programs. Accordingly, there exists a need for a new video format for use with a home video recording apparatus.

To this end, the subject invention provides a video magazine which is a series of magazine-format programs distributed on video through non-traditional, non-broadcast outlets. As in the case of a printed magazine, the new and improved video magazine of the subject invention is designed and provides video productions which are specifically designed for home viewing, and which are specifically designed to be viewed over and over again. As in the case of a printed magazine, the video magazine provides a series of programs, some of which may be of greater interest to the viewer than other programs. Accordingly, the video magazine of the subject invention includes both a video replay means, in the form of a video tape cassette or a video disc, along with a printed program guide, the subject matter of which corresponds to the series of programs on the video replay means.

Usually, a home-viewing recorder apparatus includes some form of locating or indexing means in order to provide the user with an indication as to the location of the tape or disc which is being displayed on the recorder apparatus. The printed program of the subject video magazine includes a series of printed program guides corresponding to each program in the series of indexable video programs on the video tape cassette or video disc. Hence, by referring to the printed program, the user may readily index the video cassette in the video recording apparatus to the desired program of the series of programs thereon. Thus, as in the case of reading a conventional printed magazine, the user of the subject video magazine may readily scan the guide to determine which programs he wishes to view on the video cassette, and then merely index the video cassette in the video recording apparatus to the desired program for his watching enjoyment.

To facilitate the distribution and display of the video magazine of the subject invention, a display package is provided that makes it ideal for distribution in quality audio and video retail outlets. The new and improved package of the subject invention is designed to fit in conventional record album sales racks, and thus also makes the subject video magazine a valuable sales tool for the retailer who was formerly limited to the standard fare of old movies and tape broadcasts in demonstrating his equipment to potential customers. For the manufacturer of video equipment, the new and improved package of the subject invention holds excellent potential to take new product information directly to the target market, i.e., the home video consumer. Still further, by virtue of the design of the new and improved package of the subject invention, shoplifting of the video magazine is greatly inhibited.

Accordingly, it is an object of the subject invention to provide the owner of video recording apparatus with an alternative to the standard fare of old movies and tape network broadcasts, in the form of a new and improved video magazine which is desirably arranged in a standard magazine-format for the viewing pleasure of the user.

It is a further object of the invention to provide a new and improved display package for use with the video magazine of the subject invention, which package may be used as a point-of-purchase package that is less susceptible to shoplifting, and provides the consumer with an indication of the variety of programming available in the video magazine.

The above and other objects and advantages of the invention are embodied in a video magazine comprising the combination of a video replay means in the form of a video tape cassette or a video disc, each having a series of indexable video programs thereon, and printed program means including a series of indicia corresponding to the series of indexable video programs on the video replay means. By this arrangement, the user of the subject video magazine may, by merely referring to the printed program means, readily index the video replay means in the video recording apparatus to the desired video program. In addition, the subject invention provides an integral packaging means which accommodates both the video replay means and the printed program means in a single unit, with the package being specifically adapted and designed to fit in conventional record album sales racks, and being of a size to inhibit shoplifting. Still further, the new and improved package of the subject invention provides the consumer with an indication of the variety of programming available in the video magazine.

Further objects and advantages of the invention will become apparent from a reading of the following detailed description of the invention, taken in conjunction with the drawings in which:

FIG. 1 is an exploded perspective view of the new and improved video magazine of the subject invention, and the package therefor;

FIG. 1A is a plan view of the packaged video magazine, with a portion of the package being cut away to illustrate the printed program booklet disposed within the package;

FIG. 2 is a cross-sectional view of the new and improved package of the subject invention taken along line 2—2 in FIG. 1;

Turning to FIG. 1, a video cassette magazine and package therefor is generally indicated by the numeral 10, with the video magazine basically comprising a video replay means in the form of a video tape cassette 12 and printed program means in the form of a printed booklet 14. The new and improved package for the video magazine is designated by the numeral 16.

The video tape cassette 12 is of standard design and is adapted to be accommodated in a conventional video cassette recording apparatus (not shown), with the tape cassette 12 being programmed with a series of individual programs, the location of which are readily indexable. More particularly, the standard home video cassette recorder is normally provided with a tape counter in order to provide the user with an indication as to which portion of the tape is being viewed. Thus, the standard home video cassette recorder apparatus includes means to enable the user to index the tape of the tape cassette 12 to a desired location.

Figure 3:
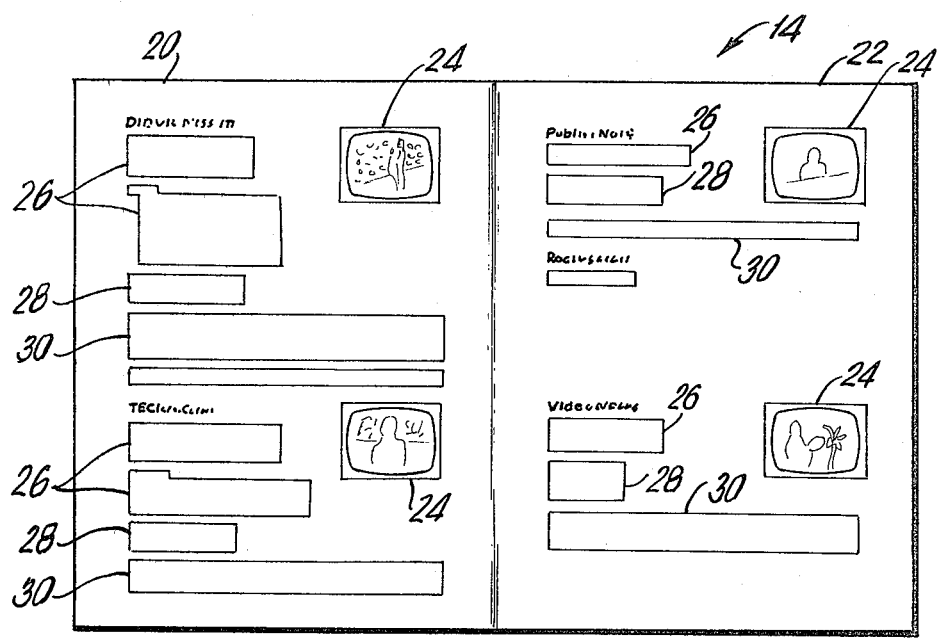
FIG. 3 is a plan view of two pages of the printed program booklet of the subject invention.

The printed booklet 14 generally comprises a series of pages which are imprinted with indicia giving the user specific program information concerning the series of programs on the video tape cassette 12. More particularly, as shown in FIG. 3, when pages 20 and 22 of booklet 14 are exposed, page 22 is seen to include indicia directed to two consecutive programs on the video tape cassette 12. As an example, the indicia for a specific program on the video tape cassette 12 may include a still scene 24 from the specific program, as well as indicia 26 indicating the title and length of the program, and credits relating to the production personnel and the editor of the program. Details concerning the specific indexing information for the different types of home video cassette recorders may be provided at 28. An abstract of the program in the video magazine may be provided, as indicated at 30. Similar information would be provided for the other programs on the tape cassette 12 and are contained on the other pages of the booklet 14. Accordingly, the user of the video magazine may readily insert the video tape cassette 12 in a standard home video recording apparatus, and by referring to the booklet 14 and the program information contained therein, decide on which program or programs he or she wish to review. Then, using the information contained in the indicia 28 for the desired program, and corresponding the index or tape counter numbers to the specific type of home recording apparatus which the user is employing, it is a simple matter for the user to advance the tape of the video tape cassette 12 to the desired index number, and then review the program. Hence, a true magazine format is provided by the video magazine of the subject invention, whereby the video tape cassette 12 and the indexing means thereof, as well as the indicia in the program booklet 14 provides the user with ready and easy access to the desired program. When that program is completed, the user may then, using the information contained in the program booklet 14, advance or rewind the tape of the video tape cassette 12 to the next desired program, by merely corelating the index information contained in the booklet 14 to the tape counter on his home video cassette recorder.

The video magazine of the subject invention is adapted to be shipped and displayed in the package 16 thereby facilitating distribution of the packaged video magazine for distribution in quality audio and video retail outlets. The new and improved package 16, which is designed to fit in standard record album sales rack, makes the subject video magazine a valuable sales tool for the retailer who was formerly limited to the standard fare of old movies and tape broadcasts in demonstrating his equipment to potential customers, and also facilitates the handling and storing of the video magazine by the home viewer. Package 16 may be made of paperboard material and basically comprises an integral arrangement of a first generally rectangular sleeve-like member 32 and a second, generally rectangular sleeve member 50. Member 32 is closed along three edges 34, 36, and 38 thereof, and open along an edge 40 for facilitating insertion therein of the printed booklet 14 (see FIG. 1A). The planar surfaces of the sleeve member 32, such as surface 42, is preferably provided with indicia in order to make the consumer aware of the variety of programming available in the video magazine. Secured to the surface 42, such as by adhesive, is the second sleevelike member 50 which is closed along three edges 52, 54 and 56, and open along an edge 58, with the sleeve member 50 being designed to accommodate the video tape cassette 12. Accordingly, the integral construction of the package 16 including the sleeve members 32 and 50 provides a convenient package for shipping and displaying the components of the video magazine. To facilitate removal of the video tape cassette 12 from the second sleeve member 50, a V-shaped cut-out 60 is provided along the edge 58 of the sleeve 50, thereby enabling the user to readily grasp the video tape cassette 12. For maintaining the video cassette 12 within the sleeve member 50, suitable retaining means in the form of an elongated strap 70 may be formed integral with the package 16. One end 72 of the strap is suitably secured, as by an adhesive to the surface 42 of the sleeve 32, with the opposite end 74 being adapted to be secured to the top surface 62 of the sleeve 50, as shown in phantom in FIG. 2, in order to maintain the video tape cassette 12 within the sleeve 50.

Accordingly, there is provided a new and improved package 16 for accommodating the subject video magazine, with the dimensions of the sleeve 32 being slightly larger than the size of the printed booklet 14 (see FIG. 1A) and generally corresponding to the standard size of a conventional phonograph record, thereby enabling the package 16 to be readily accommodated in a conventional record album sales rack. In addition, by virtue of the size of the sleeve 32 and package 16, shoplifting is minimized, and the planar surface areas of the package 16 afford ample space for indicia to make the consumer aware of the variety of programming available in the subject video magazine.

Figure 4:
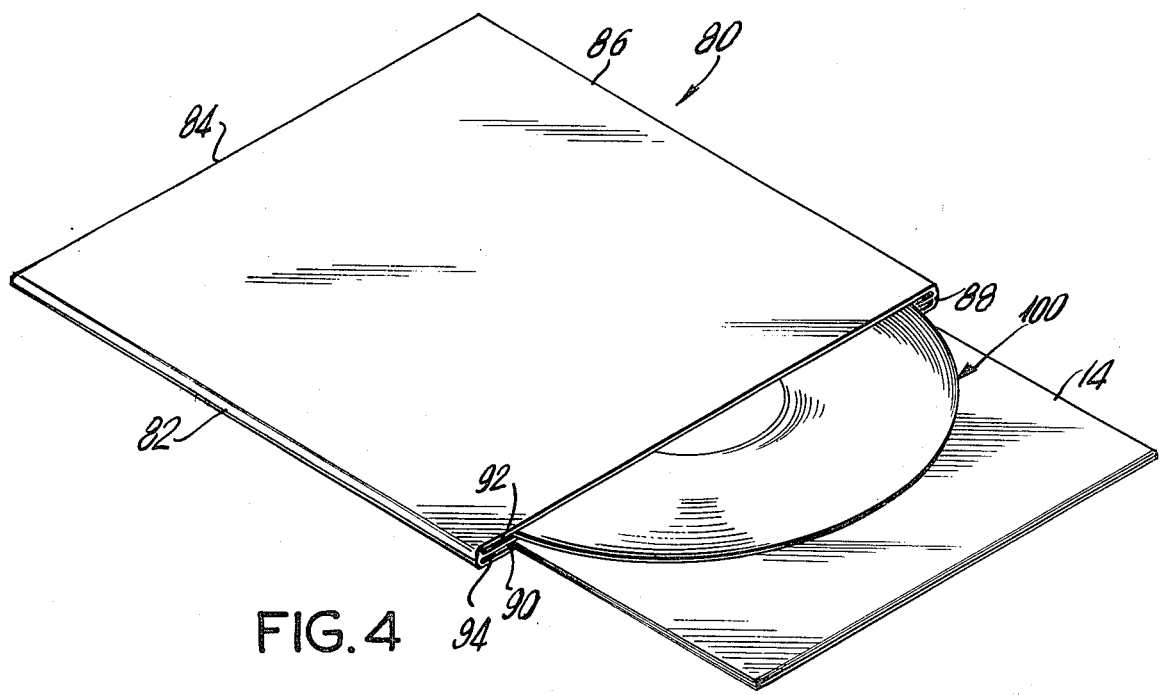
FIG. 4 is an alternate embodiment of the subject invention wherein the video magazine includes a video disc.

In the alternate embodiment of the subject invention, as shown in FIG. 4, the video replay means is in the form of a video disc, the second sleeve member is of generally the same size as the first sleeve member and the sleeve members are formed in an integral package, generally designated by the numeral 80. The latter is of sufficient size to accommodate the video disc 100, as well as the printed programming booklet 14. Package 80 is of generally sleeve-like configuration, preferably made of a paperboard material, and is closed along three edges 82, 84 and 86, while one end 88 is open. Package 80 is preferably bisected by an intermediate partition 90 thereby defining two flat, sleeve-like compartments 92 and 94 for respectively accommodating the video disc 100 and the printing booklet 14. The entire package 80 may be enclosed within an outer transparent wrapper (not shown) or a suitable retaining means (not shown) may be provided for maintaining the video disc 100 and program booklet 14 within the package 80 during shipment and display on a conventional record album sales rack.

Accordingly, there is provided a new and improved video magazine including the combination of a video replay means in the form of a video tape cassette or a video disc having a series of indexable video programs thereon, as well as a printed program in the form of a booklet which includes a series of indicia each corresponding to one of the series of indexable video programs on the video tape cassette or video disc. The consumer, by first referring to the printed programming booklet, may readily determine the program which he desires to view, and then, index his home video recorder to the designated index position, and then view the desired video program. The video magazine is readily accommodated within the new and improved integral package of the subject invention including first and second sleeve members for respectively accommodating the video replay means and the printed program booklet.

While several embodiments of the present invention have been disclosed, it is to be understood that these embodiments are given by way of example only and not in a limiting sense, the scope of the present invention being determined by the objects and the appended claims.

What is claimed is:

1. A video magazine for use with a video recording apparatus, comprising the combination of a video replay means having a series of indexable video programs thereon, and printed program means including a series of indicia, each indicia corresponding to one of the series of indexable video programs on the video replay means whereby a user of the video magazine may, by referring to the printed program means, readily index the video replay means in the video recording apparatus, to the desired video program, including an integral packaging means accommodating said video replay means and said printed program means in a single unit, said packaging means comprising a first sleeve member receiving the printed program means, and a second sleeve member connected to an outer surface of said first sleeve member accommodating said video replay means, said second sleeve member including a cut-out portion and facilitating unloading of said video replay means, and retaining means secured to said outer surface of said first sleeve maintaining said video replay means within said second sleeve.

2. A video magazine for use with a video recording apparatus, as in claim 1 wherein said video replay means is a videotape cassette.

3. A video magazine for use with a video recording apparatus, as in claim 1 wherein said video replay means is a video disc.

4. A video magazine for use with a video recording apparatus, as in claim 1 wherein said video replay means is a video disc, and wherein said packaging means comprises a generally rectangular housing subdivided into two compartments, one compartment being adapted to receive said video disc while the other compartment is adapted to receive said printed program means.

5. A video magazine as in claim 4 wherein said packaging means is made of a paperboard material.

6. A video magazine as in claim 1 wherein said printed program means comprises a paper booklet including a plurality of sheets.

* * * * *